Dec. 11, 1956           W. KNAUF           2,773,437
SUPPLEMENTARY OPERATING KNOB FOR PHOTOGRAPHIC CAMERAS
Filed June 18, 1952           3 Sheets—Sheet 1
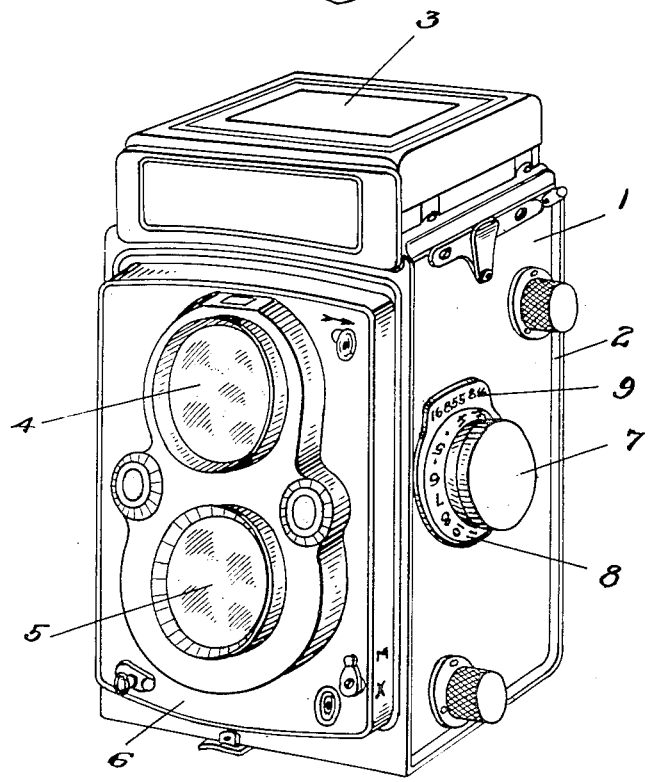
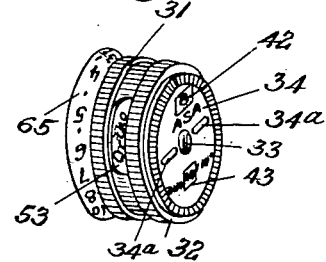
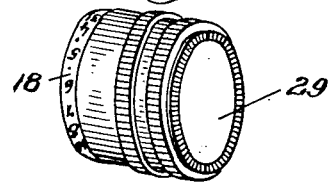

Dec. 11, 1956 W. KNAUF 2,773,437
SUPPLEMENTARY OPERATING KNOB FOR PHOTOGRAPHIC CAMERAS
Filed June 18, 1952 3 Sheets-Sheet 2
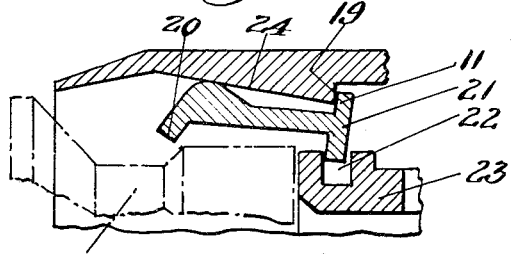
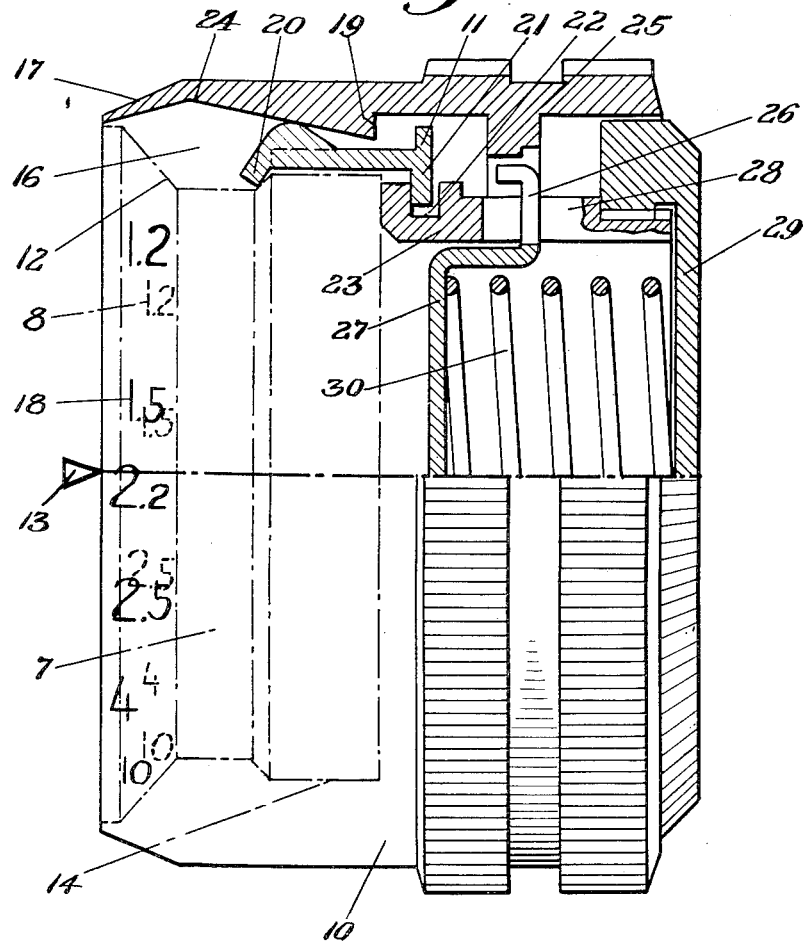

Dec. 11, 1956 W. KNAUF 2,773,437
SUPPLEMENTARY OPERATING KNOB FOR PHOTOGRAPHIC CAMERAS
Filed June 18, 1952 3 Sheets-Sheet 3

United States Patent Office 2,773,437
Patented Dec. 11, 1956

2,773,437

SUPPLEMENTARY OPERATING KNOB FOR PHOTOGRAPHIC CAMERAS

Wilhelm Knauf, Braunschweig, Germany, assignor to Franke & Heidecke, Fabrik Photographischer Präzisions-Apparate, Braunschweig, Germany, a German firm Application June 18, 1952, Serial No. 294,135

Claims priority, application Germany June 20, 1951

8 Claims. (Cl. 95—11)

This invention relates to photographic cameras, and more particularly to supplementary operating knobs for such cameras.

In many types of cameras, especially cameras of the reflex type having a reflex focusing finding chamber disposed above a picture taking chamber, both being built into a common rigid housing, the various operating knobs mounted externally on the rigid housing or body are usually of relatively small size, because it is frequently desired to retain the camera body within a carrying case of leather, for example, which must be provided with openings through which the knobs project to an accessible position, for operation even when the camera is within the carrying case. Hence the knobs are usually kept of fairly small size in order not to weaken the carrying case by requiring holes of excessive size in the case.

It is, however, desirable at times to use an operating knob of larger diameter, for more convenient and accurate grasping by the operator's fingers when the weather is very cold or when gloves are being worn. Also it is desirable at times to block off or obscure the scale graduations which appear on the normal operating knob, when different or supplementary lenses of different focal length are used, or when changing the focusing characteristics of the camera by using plates instead of films, or vice versa.

Accordingly, it is an object of the present invention to provide an inexpensive supplementary knob, easily attached to the main or normal knob and firmly secured thereto when attached, which will increase the diameter of the knob for more effective grasping under special conditions such as cold weather or the wearing of gloves.

Another object of the invention is the provision of a supplementary knob so designed as to stay firmly in place on the main or basic knob, until purposely removed therefrom, yet being capable of easy removal when desired.

Still another object is the provision of a supplementary knob so designed as to cover or mask the scale graduations of the main or basic knob, and to provide a different series of graduations.

A further object is the provision of a supplementary knob having settable or adjustable indicating means for indicating various conditions which should be borne in mind by the operator, such as the type of film and the film speed rating of the particular film with which the camera is loaded at the time.

These and other desirable objects may be attained in the manner disclosed as an illustrative embodiment of the invention in the following description and in the accompanying drawings forming a part hereof, in which:

Fig. 1 is a perspective view of a camera provided with a typical adjusting knob of the type with which the supplementary knob of the present invention may be used;

Fig. 2 is a perspective view of one embodiment of supplementary knob according to the present invention;

Fig. 3 is a view partly in side elevation and partly in diametrical axial section, through the knob shown in Fig. 2, with the basic knob to which it is applied being indicated in dot-dash lines;

Fig. 4 is a view similar to a fragment of the upper part of Fig. 3, showing the parts in a different position;

Fig. 5 is a perspective view showing a second form of supplementary knob in accordance with the present invention.

The same reference numerals throughout the several views indicate the same parts.

Figure 6:
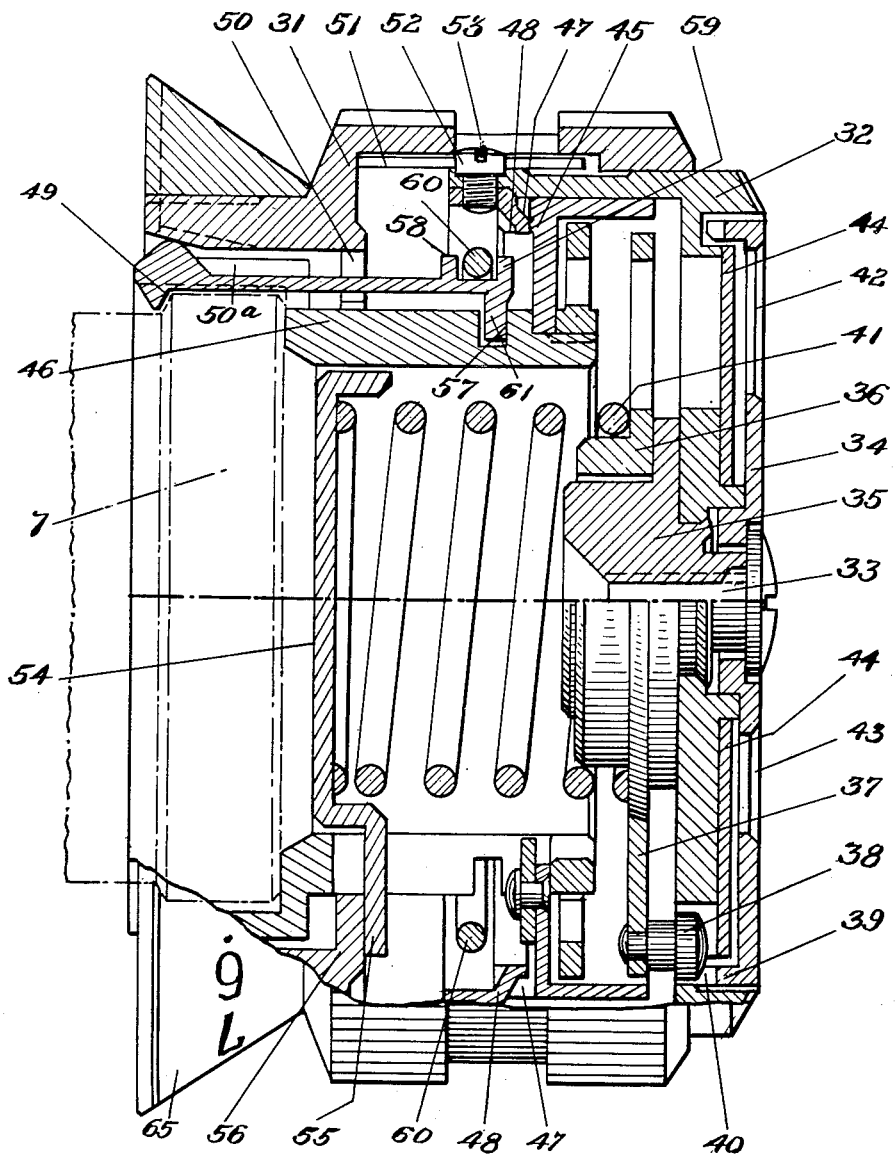
Fig. 6 is a view partly in side elevation and partly in diametrical axial section, illustrating further details of the construction of the knob shown in Fig. 5, the outline of the basic knob to which it is applied being shown in dash-dot lines.

Referring first to Fig. 1, the main camera body or housing 1 is closed by a wall 2, and is fitted at the top with a finder hood 3. Within the top of the body is a reflex finder chamber, to which light is admitted from the finder lens 4. Within the bottom of the body is the picture taking chamber, to which light is admitted through the taking lens 5 and through a suitable shutter of known form. The lenses 4 and 5 are mounted on a common front plate 6 which is slidable backwardly and forwardly for focusing purposes by means of an internal mechanism of known form, controlled by the turning knob 7 which focuses both lenses at once. The knob 7 carries a focusing scale 8 which may be read with the aid of focal length marks or other suitable index graduations 9 on the camera body. This type of camera construction is well known. Its details do not form the subject of the present invention, and it need not be further described.

The first form of supplementary knob according to the present invention, indicated in general at 10, is illustrated in Figs. 2–4. Fig. 3 shows the supplementary knob 10 in a position clamped firmly upon the knob 7, while Fig. 4 shows the clamping parts in a released position which they assume when the supplementary knob is being put onto or taken off of the main knob. The above mentioned graduations 8, here shown in dotted lines, are placed on a conical surface 12 of the knob, and are read in conjunction with one or another of the index markings 9 on the camera body, indicated diagrammatically in Fig. 3 by the triangle 13. The knob 7 is provided with the usual knurling on an enlarged part 14 at the outer end of the knob.

The supplementary knob of the present invention slips on over this enlarged part 14 of the main knob 7. The supplementary knob comprises a body which is in general of hollow annular form, containing a hollow space 16 sufficiently large to receive the entire knob 7 including the conical part 12 and the enlarged part 14 of the main knob. At the inner or rear end of the supplementary body 10 there is a conical flange 17 bearing the focusing scale 18, this conical flange 17 tapering to a small inner end just large enough to fit over the outside of the conical part 12 of the main knob, so that the supplementary graduations 18 on the part 17 may be read in conjunction with the same index markings 9, 13 which are used for the graduations 8. When the supplementary knob is used merely for the purpose of increasing the size (diameter and length) of the operating knob, without change in lenses or other characteristics of the camera, then the new scale graduations 18 on the supplementary knob will coincide exactly with the scale graduations 8 on the main knob. If the supplementary knob is designed for use with a different lens, then, of course, the scale markings 18 on the supplementary knob are made appropriately different from those on the main knob.

In the interior of the supplementary knob 10, there are a plurality of claw members 20 (for instance, three of them at equal intervals peripherally around the knob 10) arranged to clamp onto the main knob 7 to hold the supplementary knob firmly in place, yet quickly releasable when the supplementary knob is to be removed. The inner or rear ends (closest to the camera body) of these claw members 20 are shaped angularly so as to fit over the shoulder at the inner edge of the enlarged part 14 of the knob 7, as well shown in Fig. 3. The other or front ends of the claw members (farthest from the camera body) are provided with lugs or noses 11 projecting radially outwardly, and other lugs or noses 21 projecting radially inwardly, into an annular groove 22 in a sleeve 23 which is axially displaceable within the supplementary knob body 10, and which is provided with a cap 29 screwed onto the outer end of the sleeve 23.

A disk 27 extends across the interior of the sleeve 23 and has radial arms 26 which project outwardly through apertures 28 in the disk 23, to engage with an annular flange 25 formed integrally with the main body 10. By engaging with this flange 25, the arms 26 hold the disk 27 against rotation within the knob body, and also against axial movement toward the left when viewed as in Fig. 3. A coil spring 30 interposed between the parts 27 and 29 constantly presses leftwardly against the disk 27 and rightwardly against the cap 29.

Because of the influence of this spring 30, there is force constantly tending to move the cap 29 rightwardly with respect to the knob body 10, thus tending to pull the slidable sleeve 23 rightwardly, so that this sleeve engages the nose 21 on each of the claw members 20 and pulls the claw member rightwardly relative to the knob body 10, so that a bump or projection on the back of the claw member engages a conical cam surface 24 of the knob, thus moving the angular clamping ends of the claw members radially inwardly to engage tightly with the knob 7.

When it is desired to release the supplementary knob clamp for putting the supplementary knob on or taking it off from the main knob 7, the cap 29 is moved inwardly or toward the left, with respect to the body 10, against the force of the spring 30, it being remembered that the spring supporting disk 27 is anchored against axial as well as rotational movement relative to the body shell or casing 10. This causes the sleeve 23 to slide leftwardly from the position shown in Fig. 3 to the position shown in Fig. 4, so that a shoulder on the sleeve presses leftwardly on the nose 21 of each claw member, while a shoulder 19 on the body 10 presses rightwardly on the nose 11 of each claw member, as seen in Fig. 4. At the same time, the claw member is slid along the conical cam surface 24 to the larger end thereof. The combination of these movements serves to open up the claw members as seen in Fig. 4, so that the main knob 7 may be passed through the space between the claw members 20, when putting the supplementary knob on or taking it off of the main knob. After the opened claws of the supplementary knob are placed in embracing relation to the main knob, the inward pressure on the end 29 is released. Then the spring 30 pulls the parts 29 and 23 rightwardly relative to the parts 27, 10 against which the spring reacts leftwardly, thereby causing the inclined cam surface on the body 10 to force the claws 20 tightly against the inner knob.

An alternative form of supplementary knob is disclosed in Figs. 5 and 6. This alternative form serves the purpose not only of increasing the size of the operating knob of the camera, but also of providing adjustable or settable indicating means for indicating to the operator the kind or type of film with which the camera is loaded and the speed rating thereof.

In this second form of the invention, the supplementary knob comprises a main body 31 of hollow form, the right hand end of which contains a cap 32 slidable axially like a piston within the body 31. At the center of the right hand end of the knob is a screw 33, the head of which retains an outer disk 34 in a rotatable manner with respect to a nut member 35 into which the screw 33 is screwed, this nut member being staked or otherwise suitably secured to the end wall of the cap 32.

On a hub-like part of the nut member 35 a disk 36 is mounted loosely with considerable play. This disk has a radial arm 37, the outer end of which carries a pin 38 projecting rightwardly as shown. The disk or plate 34 has at its outer edge an annular flange 39 projecting leftwardly, in which flange are formed recesses or pockets 40 cooperating with the pin 38. The spring 41 presses rightwardly on the disk 36 and thus resiliently holds the pin 38 engaged with one or another of the recesses or notches 40 of the disk 34, but the pin acts as a resilient detent, permitting the disk 34 to be turned relative to the parts 32, 35, 36 whenever enough turning force is applied to the disk 34 to force the pin 38 to spring leftwardly out of the notch or recess 40 in which it happens to be engaged.

The disk 34 is provided with two window-like apertures 42 and 43, through which may be read various graduations printed or engraved on a plate 44 mounted stationarily on the cap 32 and containing suitable information as to film speeds; for example, film speeds according to the A. S. A. system readable through the window 32, and film speeds according to the D. I. N. system, readable through the window 43.

The force necessary to turn the disk 34 against the restraining action of the spring detent 38 may be derived from simple frictional finger contact with the face of the disk 34, or if desired the face of the disk may be provided with slight ridges or protuberances 34a (Fig. 5) to assist the operator's fingers in turning the disk to adjust it to a different speed rating.

In the interior of the cup-like member 32, there is another sleeve 45 movable axially like a piston and guided on the interior surface of the sleeve 32. This sleeve 45 is fixed to a smaller diameter sleeve 46 which moves axially with the sleeve 45. The left hand edge of the sleeve 45 is provided with apertures or recesses 47, in any one of which there can be engaged a nose or lug 48 which is mounted in fixed position on the sleeve 32. So long as the nose 48 remains engaged in one of the notches 47, the sleeve 32 cannot turn independently of the sleeves 45 and 46. But if the sleeve 32 be pressed axially to the left, far enough to move the nose 48 out of the notch 47 in which it is engaged, then the sleeve 32 can be turned without turning the sleeves 45 and 46. As the sleeve 46 is non-rotatably mounted in the main housing or body 31 of the supplementary knob, this construction means, in effect, that the sleeve or cup 32 cannot turn relative to the body 31 so long as the sleeve 32 is in its rightward position, with the nose 48 in a notch 47, but when the sleeve 32 is pressed inwardly (to the left when viewed as in Fig. 6) then the sleeve 32 may be turned relative to the sleeve 31.

A cylindrical member 51 extends along the interior of the body 31 in a rotatable manner, and is connected by the screw 52 to the sleeve 32 to rotate therewith. The body 31 is provided with an oval window 53 (Figs. 5 and 6) through which designations or inscriptions on the cylindrical member 51 may be read. In the embodiment shown as an example, these designations or inscriptions relate to the kind or type of film with which the camera is loaded, as for example the words "Ortho" and "Pan" and "Color." When the camera is loaded, for example, with panchromatic film, the operator presses the cup portion 32 of the supplementary knob inwardly (that is, toward the left as viewed in Fig. 6) a slight distance to release the nose 48 from the notch 47, and turns the portion 32 relative to the body 31 until the word "Pan" engraved or printed on the cylindrical member 51 comes opposite the window or sight opening 53 and is visible through this sight opening. Then the operator releases the axial pressure on the cup member 32 and the spring 41 moves the member rightwardly to its normal position, thrusting the nose 48 into the notch 47 which is opposite the nose at this time. Also the operator turns the disk 34 until the proper speed ratings of the particular film with which the camera is loaded, appear through the windows 42 and 43. If the camera is later loaded, for example, with a different type of film, such as orthochromatic film, the cup member 32 is again pressed leftwardly and turned relative to the body 31 until the word "Ortho" appears through the sight window 53, and is then released to latch the parts in this position; and the disk 34 is turned so that the proper speed ratings for this film appear through the windows 42 and 43.

The manner in which this supplementary knob or auxiliary knob is fastened onto the main knob 7, is very similar to the manner previously disclosed in connection with Figs. 2–4. The supplementary knob, in this second embodiment of the invention, is provided with a plurality (preferably three) of claw members 49, having ends which engage over the shoulder of the enlarged end of the knob 7, as before. These claw members 49 extend through notches 50 formed in an annular flange portion 56 of the body 31, and notches 50a in a flange on sleeve 46. A plate 54 extends across the interior of the supplementary knob, to form an abutment against which the left end of the coil spring 41 may thrust, and this plate 54 is held against the leftward axial movement by radial arms 55 on the plate which extend through slots 55a in the sleeve 46, and engage against the flange 56 of the body 31, as shown near the bottom of Fig. 6.

The sleeve 46 has an external annular groove 57, which receives the tail 61 of each claw member 49. On the opposite side from the tail 61, each claw member is provided with two projections or noses 58 and 59 spaced slightly from each other. A ring-shaped or circular clip member 60 extends circumferentially around all of the claw members 49 in the space between the projections 58 and 59.

A slight leftward movement of the cup member 32 relative to the knob body 31 will release the latch parts 47, 48 to permit the cup member to be turned to show a different indication of the type of film, but this slight leftward movement does not affect the clamping of the supplementary knob 31 on the main knob 7. When the supplementary knob is to be clamped on or removed from the main knob, then the cup member 32 is pressed still further to the left with relation to the knob body 31. As the leftward movement continues, the ring 60 comes against the right hand face of the flange 56 and, when it can move no further to the left, the continuing leftward movement of the sleeve 46 will produce a leftward thrust on the tail 61 of each claw member, while the clip ring 60 will produce a rightward thrust on the projection 59 of the claw member, thereby opening up the claw member away from the knob 7, in a manner similar to that in which the claw member 20 is opened up, in the first embodiment of the invention. When the leftward pressure on the end of the supplementary knob is released, the spring 47, reacting leftwardly against the parts 54, 55, 56, and 31, exerts rightward force on the parts 37, 32, 45, and 46, to draw the claws 49 against the inclined cams of the body 31.

It is seen that this second embodiment of the invention provides the same advantages as the first embodiment, with respect to making the operating knob of larger size (both in diameter and in length) for more easy manipulation in cold weather or when wearing gloves, and in addition to this, it also provides convenient indicating means for recording the type of film being used, the speed rating of the film, or other desired facts. On the supplementary knob in the second embodiment of the invention, the focusing scale is conveniently placed on a conical surface at the left end of the knob, as indicated at 65.

The supplementary knob has been described by way of example as being applied to the focusing knob of the camera. However, a supplementary knob according to the present invention can be used on any other regular or normal operating knob of the camera, as for example on a film winding knob.

It is to be noted that in both embodiments of the invention, the axially movable releasing parts are normally engaged with the outer face (right hand face) of the camera knob 7, and thus cannot move leftwardly relative to the camera knob. For instance, in Fig. 3, the left end of the sleeve 23 engages the right face of the knob 7; and in Fig. 6, the left end of the sleeve 46 engages the right face of the knob 7. Thus in both constructions, the supplementary knob or auxiliary knob cannot be disengaged or released merely by leftward pressure (toward the camera body) on the parts 29 or 32 at the right end of the knob. On the contrary, it is necessary to pull the auxiliary knob body 10 or 31 rightwardly away from the camera body, in order to release it. This is a valuable safety feature, because it prevents accidental release and loss of the supplementary knob which might result from accidental and unnoticed pressure against the end of the supplementary knob, while the camera is being carried.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A supplementary knob for an operating knob projecting from a wall of a photographic camera, comprising a hollow ring-like first portion for encircling the camera knob and having a rear end faced toward said camera wall and a front end away from said wall, said first portion having near its rear end an internal tapered part expanding toward said rear end and contracting toward said front end, a second portion constituting an end closure for the front end of said first portion and movable axially in said first portion, and a plurality of clamping members extending approximately axially within said first portion in circumferentially spaced relation to each other, for clamping on a camera knob encircled by said first portion, said clamping members each having a front end operatively connected to said second portion to move axially therewith and having a hooklike rear end movable approximately radially inwardly and outwardly to clamping and unclamping positions with relation to the camera knob encircled by said first portion and also having near its rear end a contact surface for engaging said internal tapered part of said first portion, to move the hooklike rear ends of said clamping members radially inwardly to clamping position when said clamping members and said second portion move axially forwardly relative to said first portion, said supplementary knob in clamped position being adapted to transmit clockwise and counterclockwise turning movements to said operating knob, said front end of each of said clamping members including a projection extending toward said first portion, said projections being adapted to engage with said first portion when said clamping members and said second portion move axially rearwardly relative to said first portion to cause said rear ends of said clamping members to move radially outward to an unclamping position.

2. A construction as defined in claim 1, in which said second portion is blocked against movement toward said camera wall so that said first portion must be moved outwardly away from said camera wall to produce the relative axial movement necessary to release said supplementary knob from the camera knob.

3. A construction as defined in claim 2, in which said blocking of said second portion against movement toward the camera wall is accomplished by engagement of said second portion against an end of the camera knob.

4. A construction as defined in claim 1, in which said camera knob is associated with a camera body having an index graduation cooperating with graduations on the camera knob, and in which said supplementary knob has its own graduations for cooperation with said index graduation on the camera body.

5. A construction as defined in claim 1, in which said supplementary knob completely embraces the camera knob.

6. A construction as defined in claim 1, in which said supplementary knob has a sight window and includes selectively settable indicating parts visible through said sight window for certain characteristics of the film being used in the camera.

7. A construction as defined in claim 6, including spring means normally urging said clamping members toward clamping position, the same spring means serving also the latch said settable indicating parts in set position.

8. A construction as defined in claim 6, in which said sight window is formed in a disk lying in front of said second portion and rotatable relative to said second portion.

References Cited in the file of this patent

UNITED STATES PATENTS

| | | |
|---|---|---|
| 392,062 | Pedersen | Oct. 30, 1888 |
| 732,197 | Leitz | June 30, 1903 |
| 1,015,235 | Weber | Jan. 16, 1912 |
| 1,189,606 | Miller | July 4, 1916 |
| 1,599,034 | Weston | Sept. 7, 1926 |
| 1,869,790 | Wolf | Aug. 2, 1932 |
| 2,071,147 | Watson | Feb. 16, 1937 |
| 2,112,722 | Weber | Mar. 29, 1938 |
| 2,350,733 | Drotning | June 6, 1944 |
| 2,357,328 | Harris | Sept. 5, 1944 |
| 2,448,817 | McArthur | Sept. 7, 1948 |
| 2,528,002 | Katzberg | Oct. 31, 1950 |